United States Patent Office 3,350,239
Patented Oct. 31, 1967

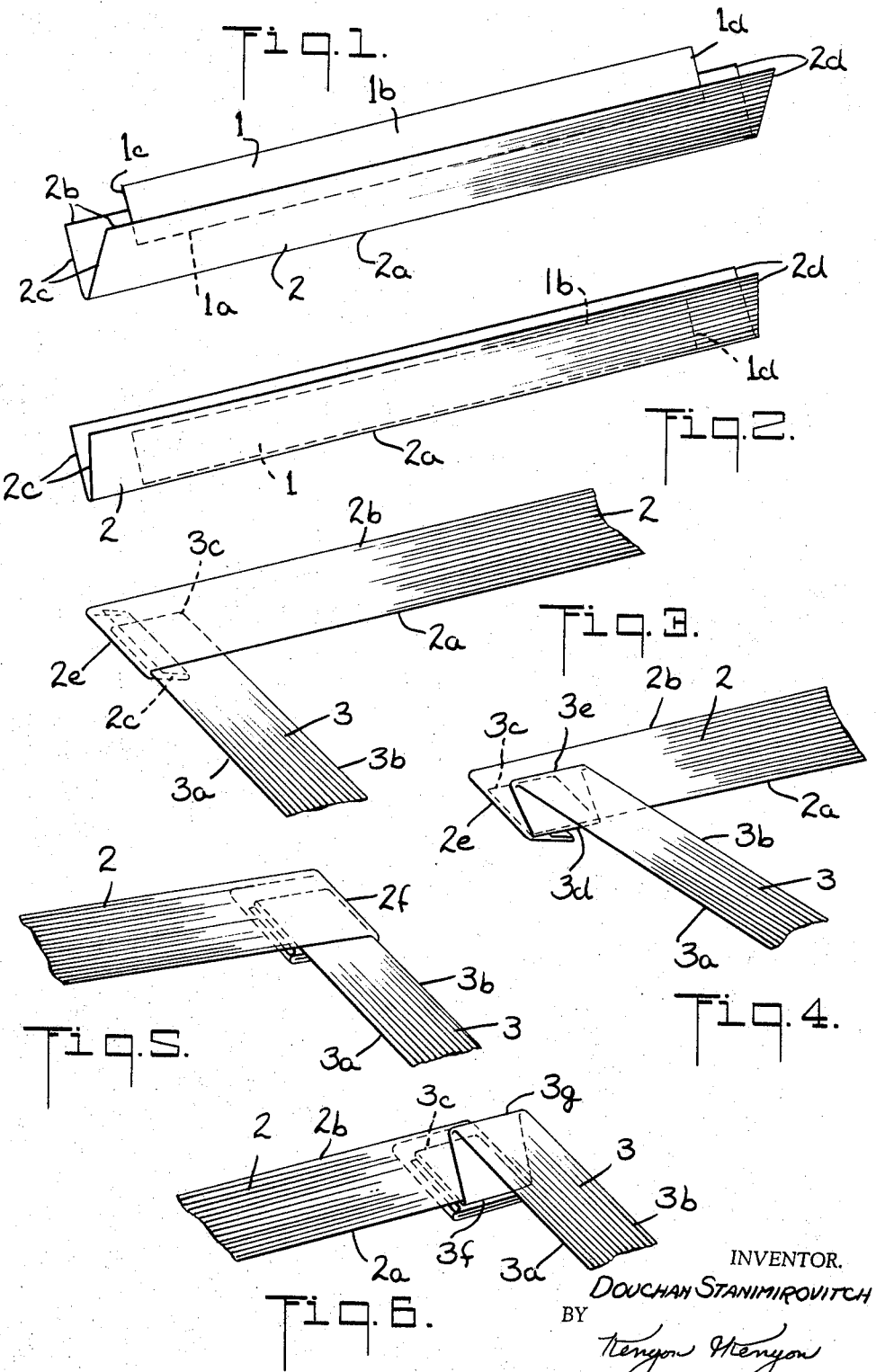

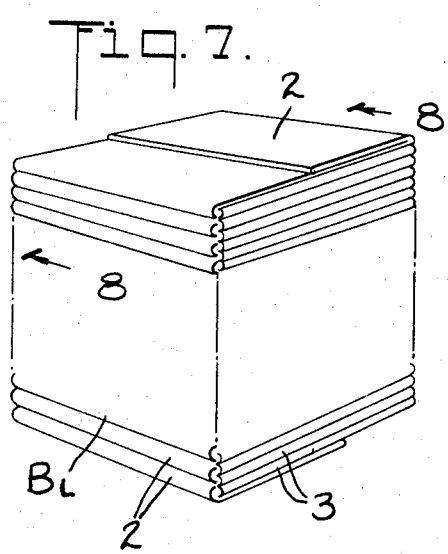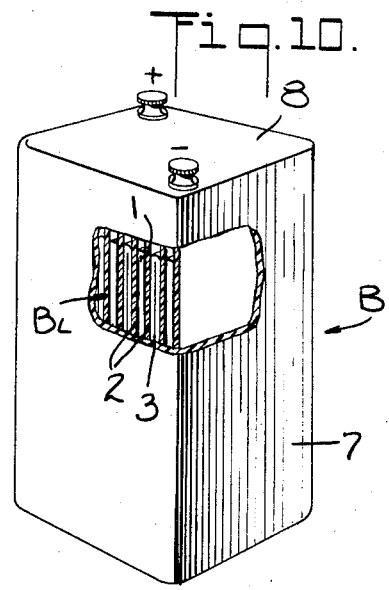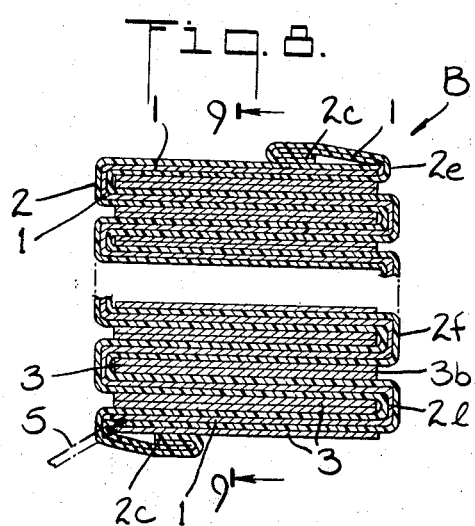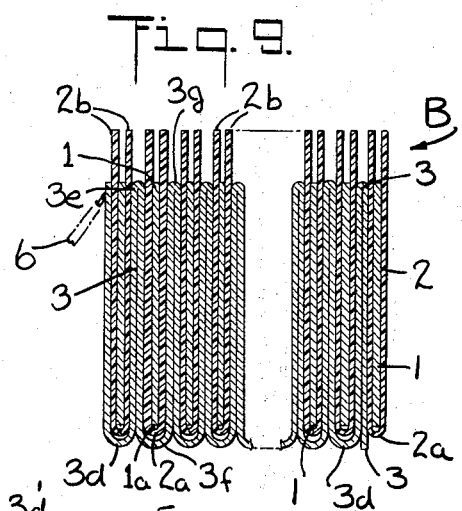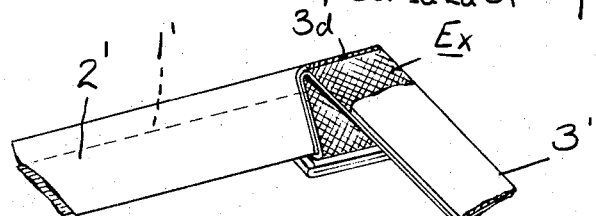

3,350,239
PROCESS FOR MANUFACTURING PRIMARY AND SECONDARY CELLS
Douchan Stanimirovitch, Paris, France, assignor to Societe des Accumulateurs Fixes et de Traction (Societe Anonyme), Romainville, France, a company of France
Filed Jan. 15, 1965, Ser. No. 425,868
Claims priority, application France, Jan. 18, 1964, 960,805
11 Claims. (Cl. 136—176)

This invention relates to electric cells of the primary and secondary type having electrodes in the form of bands or chains and a separator also in band form, said electrodes and separator being folded together and interleaved so as to constitute a block which is positioned in a casing together with an appropriate amount of electrolyte to constitute the desired cell, and to a process for manufacturing such cells.

Electrochemical cells in which the electrodes are wrapped in a separator material having the shape of a band are already known. Therein, the electrodes of like polarity are contained in an accordion-shaped envelope whereas the electrodes of other polarity are contained in U-shaped envelopes, said U-shaped envelopes being interposed between the folds of the accordion.

The positioning of such electrodes requires rather complicated manual operations and a satisfactory manner of automating such process has not been found.

The modern industry of electrochemical cell production increasingly requires utilization of continuous and automated manufacture to render possible an increased production rate and lowered manufacturing costs.

Principal objects and features of the present invention are the provision of a novel, continuous and automated process for manufacture of interassembled accordion-like folded separator-electrode blocks with resultant increased production rate and lowered manufacturing costs.

This new process is particularly noteworthy in that a first electrode in the form of a band or chain is placed in a separator folded along its longitudinal median line, then the second electrode also in the form of a band or chain and the separator containing the unfolded first electrode are folded together accordion-wise along transverse equidistant lines and interleaved in such a way that their respective transversal folding lines are perpendicular to each other.

With this process, the folding of the three components, viz. two electrodes and a separator, may be realized in such a way that the number of separator layers remains the same between the electrodes of opposite polarity. It also may be seen thus as the transversal folding lines of the second electrode are disposed perpendicularly to the transversal folding lines of the separator, that it is possible to separate the second electrode from said separator and first electrode by a mere relative sliding movement.

A mere sliding movement also is sufficient for removing the first electrode from between the folds of the median line folded separator in which it has been initially placed. Therefore, the taking apart or disassembly of the two electrodes and separator can be realized in a particularly easy way. This facilitates easy repair and maintenance.

Another characteristic of the invention provides for flat disposal of the separator with infolded electrode and the second electrode so that they are perpendicular to each other and piled up at one end of the bands. Then, the second electrode is first folded around the longitudinal middle or median folding line of the separator and then again folded upon itself; after that the separator is folded around one of the edges of the second electrode so that it is disposed on top of the two layers formed by the previously folded-up second electrode; the second electrode is then again first folded around the longitudinal folding line of the separator, and then again folded upon itself, the separator is then folded around the other edge of the second electrode, and so on unitl the block is completed. This provides accordion-like folding disposition of the combined separator-first electrode and said second electrode with folds at right angles to each other.

The invention also includes as new industrial products primary and secondary cells manufactured in accord with the novel process and is particularly noteworthy in that the electrode-separator block formed comprises a separator constituted by a band folded along a longitudinal line that is substantially the median line of the band so that a first electrode of given polarity is enclosed between the folds thereof, said separator and enclosed electrode in turn being folded accordion-wise along equidistant transversal lines, and of a second electrode of opposite polarity, said second electrode being folded along equidistant transversal lines and being interleaved between the folds of the separator so that its transversal folding lines are perpendicular to the transverse folding lines of the said separator combined with the interleaved first electrode.

Other objects and features of the invention will become apparent from the following description and the accompanying drawings forming a part hereof, wherein:

FIGURE 1 is a perspective view of a first electrode and a separator both having the shapes of continuous bands in preliminary disposition for assembly;

FIGURE 2 is a similar perspective view of the said electrode and band with the electrode assembled therewith by being placed within or interleaved with the folded faces of said separator;

FIGURE 3 is a perspective view of a separator with interleaved electrode and second electrode placed in position for accordion-like folding in accord with this invention;

FIGURES 4, 5 and 6 are similar perspective views of the same components illustrative of successive accordion-like folding steps in practicing the invention;

FIGURE 7 is a perspective view of a complete accordion-like folded separator-electrode assembly block prepared by the process of this invention;

FIGURE 8 is a sectional view taken along line 8—8 of FIGURE 7 and viewed in the direction of the arrows;

FIGURE 9 is a sectional view taken along line 9—9 of FIGURE 8 and also viewed in the direction of the arrows;

FIGURE 10 is a partially broken away perspective view of a cell in which such an assembly block has been utilized; and FIGURE 11 is a view similar to FIGURES 4–6 of a modification in process.

Referring to the drawings and first to FIGURE 1, a first electrode 1 which has the shape of an elongated rectangular band is provided. A separator 2 also substantially in the form of an elongated rectangular band also is provided. This separator band 12 is adapted to be folded in V or U-shaped manner along its longitudinal center or median line 2a. The total width of this band 2 is substantially greater than twice the width of the electrode band 1 and is also substantially longer than said electrode band. Thus, the faces of the folded separator band 2 are each substantially wider than the electrode band 1. The folding of separator band 2 along its median line 2a constitutes the first step in the assembly process of this invention. Then, the electrode band 1 is inserted between the folded faces of band 2 so that one of its longitudinal edges 1a rests against the internal surface of median fold line 2a of band 2 and the opposite end edges 1c and 1d of said band 1 are substantially centered between the opposite end edges 2c and 2d of said separator band 2, lying a substantial distance inwardly thereof, while the other longitudinal end edge 1b of the electrode 1 lies materially inwardly of the longitudinal end edges 2b of separator band 2. As a result, when electrode band 1 has been placed in assembly position within the folded separator band 2, as seen in FIGURE 2, there are substantial overlaps of the latter along its edges 2b, 2c and 2d around the corresponding edges 1b, 1c and 1d of said electrode band 1 and the latter is completely protected from short circuits.

A second electrode 3 which also has the shape of an elongated rectangular band is also provided. The next step comprises depositing this second electrode 3 on an outer surface of one of the fold faces of the separator band 2 and first electrode band 1 assembly so that it lies substantially perpendicular thereto and so that one of its ends 3c lies even with the edge 1b of electrode band 1 on an opposite side of one of the fold faces of band 2 and its long edge 3a lies even with the end 1c of said electrode band 1 and parallel therewith on said same opposite side. Then, the end part 2c of the separator band 2 which overlaps the end 1c of electrode band 1 is folded over upon itself, if necessary, forming several layers, so that the separator band ends up along a transversal folding line 2e which is substantially parallel with end 1c of electrode band 1. This latter fold being effected, the respective ends 3c of electrode band 3 and 3a of separator band 2 are arranged flatwise and disposed perpendicular to each other in such a way that edge 3a of electrode band 3 rests against the transversal folding line 2e while the upper edge 2b of separator band 2 overlaps the end 3c of electrode band 3 as seen in FIG. 3. Electrode band 3 is then folded along the transversal folding line 3d, as seen in FIG. 4, around the longitudinal folding line 2a of separator band 2, and is then folded reversely upon itself along the transversal folding line 3e which is parallel to line 2b, said folding line 3e being chosen at such a position that electrode band 3 does not protrude beyond the upper edge 2b of said separator band 2 and lies substantially parallel in overlying coincidence with the underlying previous end edge 3c that lies on the opposite side of said separator band 2. Thereafter, separator band 2 is folded along the transversal line 2f (FIGURE 5), around edge 3b of electrode band 3 (see FIGURE 5), and over the other face of the latter. Then, electrode band 3 is again folded over band 2 along a transversal line 3f around folding line 2a of said separator band 2 and is then folded reversely upon itself along transversal folding line 3g (see FIGURE 6), which lies in substantial parallel overlying coincidence with transversal fold line 3e. Separator band 2 is then again folded around edge 3a of electrode band 3 over the latter and so on. These accordion-like foldings of separator band 2 and electrode band 3 are continued for the length of band 1. As a final step thereafter, the second end 2d of separator band 2 which projects beyond the end 1d of electrode band 1 is folded over upon itself in the same way that the original end 2c of said separator band has been folded. The result is an accordion-like assembly block B, FIGURES 8 and 9 in which the transversal folds 2e, 2f, etc., and 3d, 3e, 3f, etc. of electrode bands 1 and 3 are at right angles to each other.

The electrode bands 1 and 3 are each provided with suitable connection leads 5 and 6, FIGURES 8 and 9, preferably at one of their respective ends or at any other suitable location.

The folding procedure described thus provides that separator band 2 is folded accordion-wise and included between its various transversal folds is the electrode band 3, itself folded accordion-wise and having its transversal fold lines 3d, 3e, 3f, etc., perpendicular to the transverse fold lines 2e, 2f, etc., of the separator containing the first electrode band 1. In a consequence, as can be seen by inspection of FIGURES 8 and 9, the folded block can readily be taken apart for repair simply by slipping the folds of combined separator band 2 and electrode band 1 out from the folds of electrode band 3 and after repair recombining the said parts to reconstruct the block B.

It further can be seen that with the folding method as described, the transversal folds 2e, 2f, etc., of the separator band are equidistant and separated by a distance substantially equal to the width of electrode band 3. Similarly, the transversal fold lines 3d, 3e, 3f, etc., of electrode 3 are spaced by a distance that is substantially smaller than half the width of separator band 2, being preferably equal to the width of electrode band 1.

On some occasions, the electrode bands instead of being single length strips are in the form of chain links. Obviously, when the electrodes have the shape of chain links, the accordion-folding will have to be effected preferably at the link joints between the partial electrode links with individual links each having a length so that the distance between two successive link lines is at least equal to the required length of a partial electrode, i.e., one of the facing interfolded electrode components.

Although for the sake of convenience, the electrode bands have been depicted as having finite length, it may be easily seen that the described accordion-like folding method may be practiced when the separator and electrode bands have continuous lengths, required amounts being severed as needed for blocks of required capacity.

Selection of the materials constituting electrode band 1, separator band 2 and electrode band 3 is optional and, of course, dependent upon the type of cell to be made.

The separator band 2 may be either a single layer or may be of several superposed layers. In any event, the layer or layers may be of the same or different porous, microporous or semi-permeable materials depending upon the nature of the electrode materials. Any layer or layers may, for example, be polyethylene or other suitable insulative material.

Dependent upon the nature of the electrode bands or of the separator band either the positive electrode band 1 is placed within the median line-folded separator band 2 and the negative electrode band 3 is accordion-like folded externally around the separator band or a reverse disposition may be adopted.

If one of the electrode bands embodies silver halogenated salt or silver peroxide, it is advantageous to place this electrode band within the folded separator band, the latter then being of the semi-permeable type and being constituted, for example, of regenerated cellulose sheets or of sheets of polyvinyl alcohol.

If the negative electrode band is of the soluble type such as zinc or copper, the separator band advantageously is chosen of a semi-permeable type so that no zinc or copper can reach the positive electrode band.

Blocks $B_L$ of accordion-like folded separator and electrode bands, dimensioned to desired size may be utilized to form batteries B (FIGURE 10) by mounting them in suitable casings 7 together with a chosen amount of electrolyte depending on the type of primary or secondary cell desired. The amount of electrolyte may in some cells be limited to just the amount required for impregnating the separator band and porous parts of the electrode bands.

An excess of electrolyte may also be provided and its amount chosen according to the nature of the electrode bands and desired cell.

In the case of so-called insoluble electrodes, the block of electrode bands and separator band may be wholly submerged in electrolyte in the cell casing 7.

If, on the contrary, one electrode band is such that it is dissolved during discharge being for instance of zinc, the amount of electrolyte is preferably such that the upper edges 2b of the folded separator band are not submerged so that the anodic and cathodic compartments are kept separated.

The aforedescribed accordion-like folding process results in having two adjacent layers of electrode bands 3 between two folded parts of the separator band 2 (see FIGURE 8). The connections, however, between two adjacent layers of electrode band 3 and another, an adjoining two adjacent layer parts of said band 3 is only via a single tranversal fold, i.e., by a single transverse fold portion 3*d* or 3*f* of said band 3. Such single layer fold portions provide a risk of weakening during electrochemical exchanges at least in the case where the electrode band 3 is of the soluble type. It may be protected from the electrochemical exchange however by waterproofing the region or area of separator 2 that lies in the vicinity of its median folding line 2*a*.

The nature of the electrolyte to be used depends on the material of the electrode bands and the type of cell desired. If the electrode bands are of a type, e.g., carrier metals like sintered nickel having conventional positive and negative active electrode materials incorporated therein, the electrolyte, for example, may be a 5 N potash solution or of other selected strength or type useful in alkaline batteries. If the electrode bands are to be used for forming primary cells, the electrolyte may be, for example, a potash solution or ammonium chloride (sal ammoniac) or other desirable primary cell electrolyte.

The process of this invention can also be used for manufacturing some kinds of sealed storage cells wherein the backs of the negative electrodes are utilized for consuming the oxygen evolved, e.g., during the end of charge or during overcharge. In this event, electrode band 3′ (FIGURE 11) is the negative electrode and it includes a coextensive band of expanded metal E*x* which has been placed to lie coincident with the band 3′ on one face thereof. When the two superposed bands 3′ and E*x* are folded together in accordion-like manner as seen in FIGURE 11 along line 3′*d*, two opposite adjoining faces of the adjoining negative electrode layers are spaced by two layers of said expanded metal band E*x*. In order to effect this disposition, the said interposed band of expanded metal E*x* is positioned on the appropriate surface of electrode band 3′ prior to the accordion-like folding thereof with bands 2′ and 1′ in the same manner described with respect to the first modification. Then, as the previously described, fold faces of adjacent portions of reversely folded band 3′ which ordinarily would be in contact as a result of such folding are separated from each other by two adjoining layers of expanded band E*x*. This expanded band disposition promotes their action on the gases during use of the cell. Otherwise, construction and assembly of blocks including such expanded metal bands E*x* to form cells of desired type is as described above.

It is understood that proper separator material, electrode materials and electrolyte are selected in such construction to produce the desired cell of desired size and capacity.

While specific embodiments of the invention have been described and shown, variations within the scope of the appended claims are possible and are contemplated. There is no intention of limitation to the exact disclosure herein made.

What is claimed is:
1. That improvement in the process of manufacturing primary and secondary cells comprising providing a first electrode band, providing a band of separator material of greater length and more than twice as wide as said electrode band, folding said separator band along a median line to provide two faces of substantially like width both of greater width than said electrode band, positioning said electrode band between said faces of said separator band with one longitudinal edge lying against said median line and having its end edges overlapped by the end edges of said separator band, providing a second electrode band, positioning the latter to lie substantially at right angles to assemble first electrode and separator bands, folding the overlapping end of said separator band laterally upon itself, placing the perpendicularly disposed second electrode band over the assembled first electrode and separator bands parallel with this fold and so that its leading edge lies substantially in registry with the longitudinal edge of said first electrode band remote from said median line but on an opposite face of the separator band, folding said assembled first electrode and separator bands transversely over said second electrode band, then folding said second electrode band transversely over the median fold line of said separator band onto a face of the latter, then reversely folding said second separator band transversely upon itself, then folding the assembled first electrode and separator bands transversely over the opposite face of said second electrode band, thereby effecting accordion-like folding of all said bands with the accordion-like folds of the assembled first electrode and separator band perpendicular to the accordion-like folds of the second electrode band and repeating the accordion-like folding of the respective bands to form an electrode-separator assembly block.

2. The improvement of claim 1, including the steps of subsequently placing such block in a casing together with electrolyte to provide the desired cell.

3. The improvement of claim 1 wherein the first electrode is a soluble electrode that is consumed during discharge of the cell.

4. The improvement of claim 1, wherein the second electrode is of consumable material and wherein the separator band is waterproofed in the area in vicinity of the median line fold to protect said second electrode against weakening.

5. The improvement of claim 1 including the provision of a band of expanded metal of substantially the same dimensions applied to a surface of said second electrode band in advance of its accordion-like folding which thereby provides separation of co-extensive faces of said second band by pairs of fold faces of said band of expanded metal.

6. The improvement of claim 1, wherein the respective bands have indefinite lengths which are folded together in said accordion-like fashion in a continuous manner.

7. The improvement of claim 1, wherein the electrode band intended to constitute the negative electrode in the cell is of a soluble metal and said separator band is of semi-permeable material.

8. The improvement of claim 7 wherein said soluble metal is selected from the group consisting of zinc and copper.

9. The improvement of claim 1 including the steps of subsequently saturating the electrode bands and separator band material of the assembly block with electrolyte and then placing the electrolyte saturated block in a casing to provide the desired cell.

10. The improvement of claim 1, wherein said separator band is selected from the group consisting of porous, micro-porous and semi-permeable materials.

11. The improvement of claim 1, wherein said first and second electrode bands are of chain-like link form with joints between links and wherein the accordion-like folds are effected along said joints.

References Cited

UNITED STATES PATENTS

| 1,548,539 | 8/1925 | Martus et al. | 136—111 |
| 3,216,859 | 11/1965 | Duncan | 136—147 X |
| 3,239,380 | 3/1966 | Berchielli | 136—111 X |

WINSTON A. DOUGLAS, *Primary Examiner.*

B. J. OHLENDORF, A. SKAPARS,
*Assistant Examiners.*